United States Patent
Yang

[19]

[11] Patent Number: 6,137,216

[45] Date of Patent: Oct. 24, 2000

[54] LUMINESCENT PHOSPHOR COMPOSITION AND DISPLAY

[75] Inventor: Jianping P. Yang, Boise, Id.

[73] Assignee: Micron Technology, Inc., Boise, Id.

[21] Appl. No.: 09/141,816

[22] Filed: Aug. 28, 1998

[51] Int. Cl.$^7$ ........................................................ H01J 1/62

[52] U.S. Cl. ............................................. 313/486; 313/495

[58] Field of Search ........................ 252/301.4 R, 301.4 P, 252/301.6 R, 301.6 P; 313/486, 495

[56] References Cited

U.S. PATENT DOCUMENTS

| | | | |
|---|---|---|---|
| 3,639,254 | 2/1972 | Peters | 252/301.4 |
| 4,818,433 | 4/1989 | Sigai et al. | 252/301.4 |
| 5,105,121 | 4/1992 | Sigai et al. | 313/486 |
| 5,989,454 | 11/1999 | Rao | 252/301.4 |

OTHER PUBLICATIONS

Peters, T.E. et al., "Luminescene and Structural Properties of Thiogallate Phosphors $Ce^{+3}$ and $Eu^{+2}$ –Activated Phosphors. Part I", *J. Electrochem. Society—Solid State Science and Tech*, vol. 119, #2, pp. 230–236 (Feb. 1972).

*Primary Examiner*—Nimeshkumar D. Patel
*Assistant Examiner*—Todd Reed Hopper
*Attorney, Agent, or Firm*—Wells, St. John, Roberts, Gregory & Matkin, P.S.

[57] ABSTRACT

Luminescent phosphor compositions comprising thulium doped lanthanum aluminates are disclosed. In one aspect of the invention, a luminescent phosphor composition comprises:

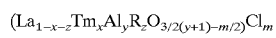

$$(La_{1-x-z}Tm_xAl_yR_zO_{3/2(y+1)-m/2})Cl_m$$

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$. In another aspect, a luminescent phosphor composition consists essentially of such material. Such materials are advantageously used in displays such as field emission displays, and particularly high electron density field emission and other displays.

31 Claims, 1 Drawing Sheet

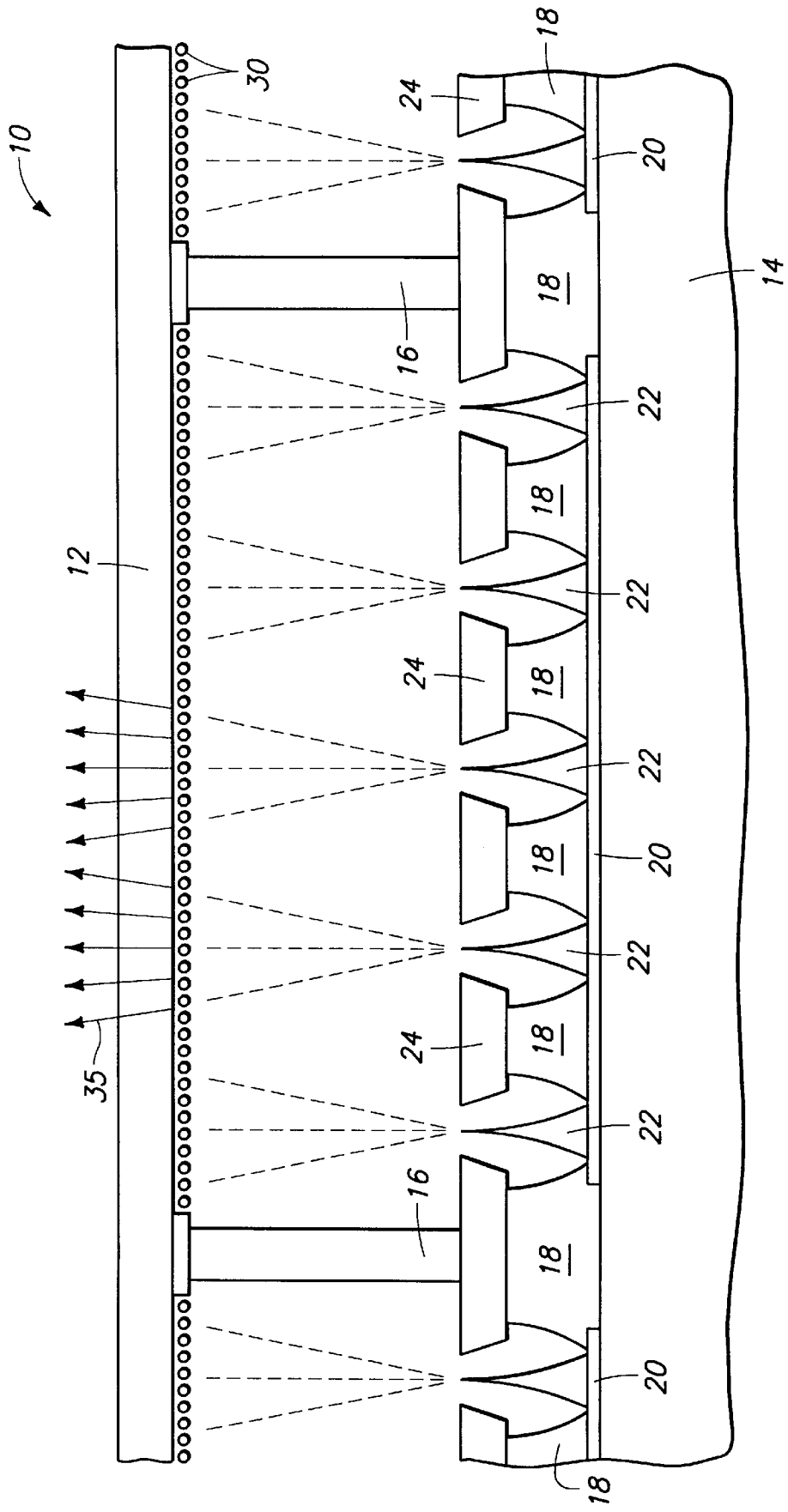

LUMINESCENT PHOSPHOR COMPOSITION AND DISPLAY

PATENT RIGHTS STATEMENT

This invention was made with Government support under Contract No. DABT63-97-C-0001 awarded by Advanced Research Projects Agency (ARPA). The Government has certain rights in this invention.

TECHNICAL FIELD

This invention relates to luminescent phosphor compositions and to field emission and other displays.

BACKGROUND OF THE INVENTION

Luminescent materials emit light when exposed to certain radiation, such as electron radiation. Certain luminescent materials are useful as phosphors in video displays. For example, cathode ray tubes and field emission displays function by having a layer of phosphor-comprising material applied on an internal surface of a face or display plate. Radiant energy impinged upon the face plate causes the phosphors to luminesce. Color displays typically include three different types of phosphors, namely red, green and blue (RGB), which, when excited in various combinations, produce colors for presentation through the face of the display. The phosphor-comprising material is typically oriented or arranged in a series of discrete areas comprising one type of phosphor, and are referred to as pixels.

Field emission display (FED) technology continues to be developed with an intent to replace the relatively bulky cathode ray tubes of the past. FED devices typically comprise a microtip structure comprising tiny conical electron emitters. The emitters are made as small as possible, with hundreds of them being utilized to illuminate a single pixel. Certain field emission display applications achieve high electron density, which in the context of this document is defined as anything greater than or equal to 1 microamp/cm$^2$ of electrons. Many existing phosphor materials are not particularly stable or operate satisfactorily at such electron densities.

Accordingly, there is a continuing need to develop different or improved phosphors.

SUMMARY OF THE INVENTION

The invention contemplates luminescent phosphor compositions comprising thulium doped lanthanum aluminates. In one implementation, a luminescent phosphor composition comprises:

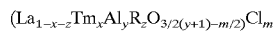

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$. In another aspect, a luminescent phosphor composition consists essentially of such material. Such materials are advantageously used in field emission and other displays, and particularly high electron density displays.

BRIEF DESCRIPTION OF THE DRAWINGS

Preferred embodiments of the invention are described below with reference to the following accompanying drawings.

FIG. 1 is a diagrammatic sectional view of a field emission display in accordance with the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention in one embodiment comprises a luminescent phosphor composition comprising:

$(La_{1-x-z}Tm_xAl_yR_zO_{3/2(y+1)-m/2})Cl_m$ where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$. Most preferably, the luminescent phosphor composition consists essentially of such formula. Such compositions in the preferred embodiment are characterized by blue peak emission. Further preferably, z>0 and 0<m≦0.05. R and Cl enhance efficiency in light generation of the composition. Other thulium doped lanthanum aluminate materials and mixtures a phosphor compositions are possible and contemplated.

A process for preparing a luminescent phosphor composition in accordance with this invention consisting essentially of thulium-doped lanthanum aluminate phosphors as described above comprises blending thulium oxide, lanthanum oxide, aluminum oxide, and ammonium chloride together in desired ratios to form a relatively uniform admixture, such as by ball-milling. The mixture is thoroughly dried, and then fired at a temperature ranging from 1100° C. to 1650° C. for greater than one-half hour to form a useable blue phosphor powder, particularly one which is stable even at high electron density operation.

Another method for forming thulium-doped lanthanum aluminates as referred to above comprises precipitation from solution. For example here, the desired constituents are dissolved in an aqueous solution in the desired molar ratios. Chlorine might be provided from HCl. This solution is then combined with an organic solution, such as an organic acid. The pH is then preferably adjusted upwardly, for example to greater than or equal to 5. A precipitate results and is collected, such as by filtering or centrifuge. The precipitate is then preferably subjected to two firing steps. A first step is preferably conducted at from about 400° C. to about 1000° C. for from about 0.5 hour to 4 hours. The resulting material is then fired again from about 1100° C. to about 1650° C. for greater than or equal to 0.5 hour. The first firing advantageously results in decomposing of the precipitate to the desired thulium-doped lanthanum aluminate phosphor composition.

The following two specific examples are provided, and are merely illustrative and representative of but two example embodiments for carrying out the invention.

EXAMPLE I

A mixture of the following was formed.

| | |
|---|---|
| $Tm_2O_3$ | 0.118 g. |
| $La_2O_3$ | 20.0 g. |
| $Al_2O_3$ | 7.10 g. |
| $NH_4Cl$ | 5.0 g. |

This mixture was ball-milled sufficiently to achieve thorough mixing, and subsequently dried. It was then fired at 1500° C. for 10 hours. After cooling and pulverizing, a material was obtained having a composition represented by the formula $La_{0.995}Tm_{0.005}AlO_{2.995}Cl_{001}$.

EXAMPLE II

Forty (40) grams of $La_2O_3$, 0.3313 g. of $Tm_2O_3$, and 65.8 g. of $AlCl_3.H_2O$ were dissolved in 100 ml. of water and 80 ml. of HCl. This solution was suitably stirred. 56 grams of oxalic acid was combined with 400 ml. of water, with the resulting mixture then being combined with the immediately above solution. The pH of the resultant solution was increased to 8 by addition of a suitable quantity of $NH_3.H_2O$. A precipitate formed, and was separated and dried at 100° C. for 4 hours. The resulting precipitate was fired at 800° C. for 2 hours. Subsequently, the resultant mixture was fired at 1500° C. for 10 hours, producing a composition represented by $La_{0.993}Tm_{0.007}AlO_{2.995}Cl_{0.01}$.

Compositions of the invention are useful in the fabrication of field emission displays, and particularly for blue phosphors suitable in high electron density field emission displays, such as exemplified in FIG. 1. Such schematically illustrates a field emission display device 10 comprising a transparent face or anode plate 12 and a base or cathode plate 14. A plurality of spacers 16 separate, support and offset face plate 12 from base plate 14. A vacuum gap is provided between base plate 14 and face plate 12. Base plate 14 is, for example, made out of sodalime glass, and typically comprises a layer of silicon nitride 18. A row electrode 20 interconnects and supports a plurality of emitters 22 received within or relative to silicon nitride layer 18. A conductive layer is formed over silicon nitride layer 18 and is patterned to form a column grid or electrode 24. Emitters 22 are typically sharp cones that produce electron emission (exemplified by the dashed lines) in the presence of an intense electric field. In the display shown in FIG. 1, a voltage that is positive relative to the sharp emitters is applied to a selected column electrodes 24 to provide the intense electric field used to produce cold-cathode electron emission.

Face plate 12 is transparent and includes a transparent conductor layer (not shown) received on the internal surface thereof. Overlying this conductor are a series of phosphor dots 30. Emission of electrons from emitters 22 onto phosphor 30 produces visible light through plate 12, indicated by arrows 35, perceptible by a viewer. Phosphor 30 preferably comprise luminescent phosphors as described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A luminescent phosphor composition comprising:

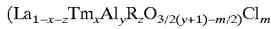

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$.

2. The luminescent phosphor composition of claim 1 wherein Z=0.

3. The luminescent phosphor composition of claim 1 wherein Z>0.

4. The luminescent phosphor composition of claim 1 wherein m=0.

5. The luminescent phosphor composition of claim 1 wherein m>0.

6. The luminescent phosphor composition of claim 1 wherein $0<m \leq 0.05$.

7. The luminescent phosphor composition of claim 1 wherein $0<m \leq 0.01$.

8. The luminescent phosphor composition of claim 1 wherein z=0 and m=0.

9. The luminescent phosphor composition of claim 1 wherein z=0 and m>0.

10. The luminescent phosphor composition of claim 1 wherein z>0 and m>0.

11. The luminescent phosphor composition of claim 1 wherein R is at least $Tb^{3+}$.

12. The luminescent phosphor composition of claim 1 wherein R is at least $Ga^{3+}$.

13. The luminescent phosphor composition of claim 1 wherein R is at least $Ce^{3+}$.

14. A luminescent phosphor composition consisting essentially of

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$.

15. A field emission display comprising:
a base plate comprising a plurality of electron emitters; and
a face plate joined from the base plate and comprising a luminescent phosphor composition comprising

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$.

16. A high electron density display comprising:
a base plate comprising a plurality of electron emitters; and
a face plate spaced from the base plate and comprising blue, green and red luminescent phosphor compositions, the blue phosphor composition comprising

where R is at least one of $Tb^{3+}$, $Ga^{3+}$, and $Ce^{3+}$; $0.001 \leq x \leq 0.05$; $0.5 \leq y \leq 3$; $0 \leq z \leq 0.05$; and $0 \leq m \leq 0.05$.

17. The high electron density display of claim 16 wherein Z=0.

18. The high electron density display of claim 16 wherein Z>0.

19. The high electron density display of claim 16 wherein m=0.

20. The high electron density display of claim 16 wherein m>0.

21. The high electron density display of claim 16 wherein $0<m \leq 0.05$.

22. The high electron density display of claim 16 wherein $0<m \leq 0.01$.

23. The high electron density display of claim 16 wherein z=0 and m=0.

24. The high electron density display of claim 16 wherein z=0 and m>0.

25. The high electron density display of claim 16 wherein z>0 and m>0.

26. The high electron density display of claim 16 wherein R is at least $Tb^{3+}$.

27. The high electron density display of claim 16 wherein R is at least $Ga^{3+}$.

28. The high electron density display of claim 16 wherein R is at least $Ce^{3+}$.

29. The high electron density display of claim 16 comprising a field emission display.

30. A luminescent phosphor composition comprising a thulium doped lanthanum aluminate.

31. A video display having an internal surface comprising a luminescent phosphor of thulium doped lanthanum aluminate.

* * * * *